US009133035B2

(12) United States Patent
Yun et al.

(10) Patent No.: US 9,133,035 B2
(45) Date of Patent: Sep. 15, 2015

(54) METHOD OF MANUFACTURING A GRAPHENE FIBER

(75) Inventors: Yong Ju Yun, Daejeon (KR); Kibong Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 334 days.

(21) Appl. No.: 13/619,935

(22) Filed: Sep. 14, 2012

(65) Prior Publication Data
US 2013/0272950 A1   Oct. 17, 2013

(30) Foreign Application Priority Data
Apr. 16, 2012   (KR) .................... 10-2012-0039129

(51) Int. Cl.
| | |
|---|---|
| C01B 31/04 | (2006.01) |
| B82Y 30/00 | (2011.01) |
| B82Y 40/00 | (2011.01) |
| D01F 9/12 | (2006.01) |
| D01F 6/60 | (2006.01) |
| D01D 5/00 | (2006.01) |

(52) U.S. Cl.
CPC ............. *C01B 31/0476* (2013.01); *B82Y 30/00* (2013.01); *B82Y 40/00* (2013.01); *D01F 6/60* (2013.01); *D01F 9/12* (2013.01); *D01D 5/003* (2013.01)

(58) Field of Classification Search
CPC .................... C01B 31/0438; C01B 31/0484
USPC ................. 423/445 R, 445 B; 252/378 R
See application file for complete search history.

(56) References Cited

U.S. PATENT DOCUMENTS

2011/0318257 A1*  12/2011  Sokolov et al. ............... 423/448

FOREIGN PATENT DOCUMENTS

KR         10-1121557 A      2/2012

OTHER PUBLICATIONS

Yunzhen Chang, Gaoyi Han, Miaoyu Li, Fei Gao, Graphene-modified carbon fiber mats used to improve the activity and stability of Pt catalyst for methanol electrochemical oxidation, Carbon, vol. 49, Issue 15, Dec. 2011, pp. 5158-5165, ISSN 0008-6223, http://dx.doi.org/10.1016/j.carbon.2011.06.099.*

(Continued)

*Primary Examiner* — Richard M Rump
(74) *Attorney, Agent, or Firm* — Rabin & Berdo, P.C.

(57) ABSTRACT

A method of manufacturing a graphene oxide composite fiber includes forming a supporting fiber having positive charges thereon; forming a solution containing graphene oxide having a negative charge thereon to provide a graphene oxide-containing solution; coating the supporting fiber with the graphene oxide-containing solution; and permitting self-assembly of the graphene oxide of the graphene oxide-containing solution and the supporting fiber by an attraction between the positive and negative charges to form the graphene oxide composite fiber. The method may include coating the supporting fiber with a solution containing a material having an amine group to provide a positive surface charge on the supporting fiber. The method may include reducing the graphene oxide composite fiber to a graphene composite fiber, such as by one of a thermal reduction method, an optical reduction method, and a chemical reduction method. Large-area graphene fiber structures having high strength, flexibility, and porosity are enabled.

13 Claims, 5 Drawing Sheets

(56) References Cited

OTHER PUBLICATIONS

Chang, Yunzhen, et al. "Graphene-modified carbon fiber mats used to improve the activity and stability of Pt catalyst for methanol electrochemical oxidation." Carbon 49.15 (2011): 5158-5165.*

Ok Ja Yoon, Chang Yong Jung, Il Yung Sohn, Hyung Jin Kim, Byungyou Hong, Myung S. Jhon, Nae-Eung Lee, Nanocomposite nanofibers of poly(d, l-lactic-co-glycolic acid) and graphene oxide nanosheets, Composites Part A: Applied Science and Manufacturing, vol. 42, Issue 12, Dec. 2011, pp. 1978-1984, ISSN 1359-835X.*

Shen, Jianfeng, et al. "Covalent attaching protein to graphene oxide via diimide-activated amidation." Colloids and Surfaces B: Biointerfaces 81.2 (2010): 434-438.*

Fan, Xiaobin, et al. "Deoxygenation of exfoliated graphite oxide under alkaline conditions: a green route to graphene preparation." Advanced Materials 20.23 (2008): 4490-4493.*

Lee et al., "Three-Dimensional Self-Assembly of Graphene Oxide Platelets Into Mechanically Flexible Macroporous Carbon Films", Angew. Chem. Int. Ed., vol. 49, pp. 10084-10088, 2010.

Eda, et al., "Large-area ultrathin films of reduced graphene oxide as a transparent and flexible electronic material", Nature nanotechnology, vol. 3, 270-274, 2008.

Dikin, et al "Preparation and characterization of graphene oxide paper", Nature06016, vol. 448, pp. 457-460, 2007.

Chen, et al., "Three-dimensional flexible and conductive interconnected graphene networks grown by chemical vapour deposition", Nature Materials, vol. 10, pp. 424-428, 2011.

* cited by examiner

METHOD OF MANUFACTURING A GRAPHENE FIBER

CROSS-REFERENCE TO RELATED APPLICATIONS

This U.S. non-provisional patent application claims priority under 35 U.S.C. §119 to Korean Patent Application No. 10-2012-0039129, filed on Apr. 16, 2012, the entirety of which is incorporated by reference herein.

BACKGROUND

The inventive concept relates to methods of manufacturing a fiber and, more particularly, to methods of manufacturing a graphene fiber.

Fibers have been increasingly demanded with an increase of population and development of an industry. New fibers having more excellent function than a natural fiber have been increasingly demanded. Dupont Co. (U.S.A) announced a new synthetic fiber so-called 'Nylon' in 1938. Thereafter, a polyester fiber, an acrylic fiber, and a polyurethane fiber have been developed. Recently, various researches have been conducted for high performance and high functional fibers and nano fibers using new materials overcoming performance limitation of existing materials.

Graphene includes carbon atoms constituting hexagonal shapes. Each of hexagonal shapes may consist of six carbon atoms. The graphene has a single-layered structure where the hexagonal shapes are two-dimensionally arranged. The structure of the graphene may be similar to that of graphite consisting of plates three-dimensionally stacked. The plates of the graphite may be divided to form the graphene. For example, the plates of the graphite may be divided using a scotch tape. The graphene may have excellent properties such as a surface area (e.g., about 2650 $m^2/g$) two times or more than active carbon, a high elasticity force (e.g., about 1 TPa), and chemical stability as well as electric properties such as high conductivity (e.g., $1\times10^{-6}$ $\Omega$cm) and high electron mobility. Recently, it has been announced that the graphene also has antibiosis removing bacteria. Thus, the graphene have been developed in various fields such as a display, a cathode material of a lithium-ion battery, an electrode material of an electric double-layered capacitor, environmental filters, and biomaterials.

SUMMARY

Embodiments of the inventive concept may provide methods of easily manufacturing a graphene fiber having a large area.

According to embodiments of the inventive concept, a method of manufacturing a graphene fiber includes: forming a supporting fiber; forming a graphene oxide-containing solution; coating the supporting fiber with the graphene oxide-containing solution to form a graphene oxide composite fiber; and separating the supporting fiber from the graphene oxide composite fiber.

In some embodiments, the supporting fiber may be a polymer fiber. A polymer solution may be electro-spun on a collector to form the polymer fiber. The polymer solution may be formed by dissolving a polymer material in a solvent. The polymer fiber may have insolubility to by using an ammonia solution or a sodium hydroxide solution. The polymer fiber may be coated with an amine group-containing solution so that the polymer fiber may have a high reactivity with respect to graphene oxide. The amine group-containing solution may include at least one of bovine serum albumin (BSA), amyloid beta, poly-D-lysine, poly-L-lysine, and chitosan.

In other embodiments, forming the graphene oxide composite fiber may include: self-assembling graphene oxide of the graphene oxide-containing solution and the supporting fiber.

In still other embodiments, separating the supporting fiber from the graphene oxide composite fiber may include: thermally treating or chemically melting the graphene oxide composite fiber. The thermal treating may be performed at a temperature within a range of about 25 degrees Celsius to about 3000 degrees Celsius (particularly, a range of about 100 degrees Celsius to about 3000 degrees Celsius) for a thermal treating time within a range of about 1 minute to about 24 hours. The chemical melting may be performed using an acid-based solvent. The acid-based solvent may include at least one of acetic acid ($C_2H_4O_2$), formic acid (HCOOH), citric acid ($C_6H_8O_7$), hydrochloric acid (HCl), sulfuric acid ($H_2SO_4$), nitric acid ($HNO_3$), perchloric acid ($HClO_4$), fluoric acid (HF), phosphoric acid ($H_3PO_4$), chromic acid ($HCrO_4$), $CH_3CH_2COOH$, oxalic acid, glycol acid, tartaric acid ($C_4H_5O_6$), acetone, and toluene.

In even other embodiments, the method may further include: reducing the graphene oxide composite fiber to a graphene composite fiber. The graphene composite fiber may be reduced from the graphene oxide composite fiber by a thermal reduction method, an optical reduction method, or a chemical reduction method. The thermal reduction method may be performed at a temperature within a range of about 40 degrees Celsius to about 3000 degrees Celsius. The optical reduction method may use light of a wavelength within a range of about 200 nm to about 1500 nm. The chemical reduction method may use a chemical reagent including at least one of hydriodic acid with acetic acid (HI—AcOH), hydrazine ($N_2H_4$), dimethyl hydrazine ($C_2H_8N_2$), sodium borohydride ($NaBH_4$), sodium hydroxide (NaOH), ascorbic acid, glucose, hydrogen sulfide ($H_2S$), hydroquinone ($C_6H_4(OH)_2$), and sulfuric acid ($H_2SO_4$).

BRIEF DESCRIPTION OF THE DRAWINGS

The inventive concept will become more apparent in view of the attached drawings and accompanying detailed description.

DETAILED DESCRIPTION OF THE EMBODIMENTS

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Figure 1:
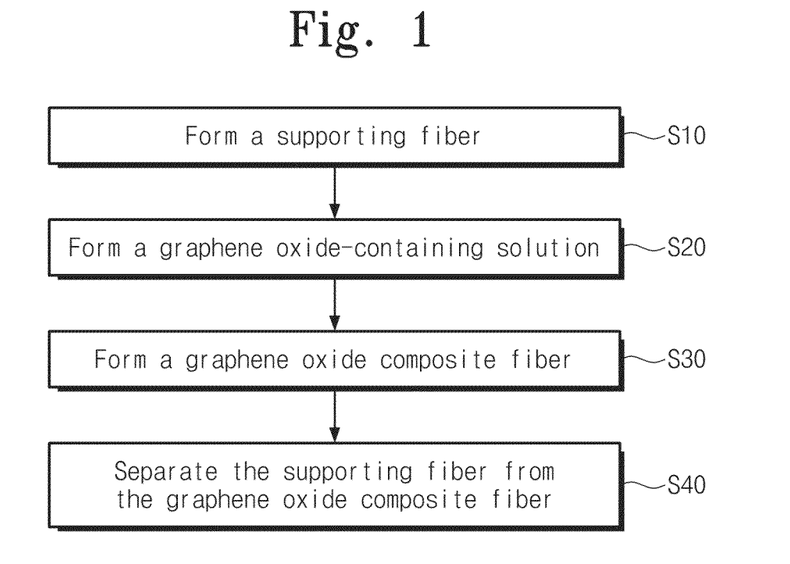
FIG. 1 is a flow chart illustrating a method of manufacturing a graphene fiber according to some embodiments of the inventive concept.

FIG. 1 is a flow chart illustrating a method of manufacturing a graphene fiber according to some embodiments of the inventive concept.

Referring to FIG. 1, first, a supporting fiber may be formed (S10). The supporting fiber may be a polymer fiber. A polymer solution may be electro-spun on a collector to form the polymer fiber. The polymer solution may be formed by dissolving a polymer material in a solvent.

The polymer material may include at least one of polyamide-6, polyamide-6,6, polyurehthanes, polybenzimidazole, polyacrylonitrile, polyaniline (PANI), polyvinylcarbazole, polyacrylamide (PAAm), polyimide, poly-metaphenylene isophtalamides, polylactic-co-glycolic acid, poly caprolactone, polyglycolide, poly lactic acid, poly-3-hydroxylbutyrate, betaamyloid, collagen, fibrin, chitosan, and gelatin.

The solvent may include at least one of water, ethanol, methanol, acetone, phosphate buffered saline (PBS) buffer, acetic acid ($C_2H_4O_2$), formic acid ($CH_2O_2$), hexafluoro-2-propanol (($CF_3$)$_2$CHOH), trifluoroaceticacid ($C_2HF_3O_2$), dichloromethane ($CH_2Cl_2$), acetonitrile ($C_2H_3N$), benzene ($C_6H_6$), 1-butanol ($C_4H_{10}O$), 2-butanol ($C_4H_{10}O$), 2-butanone ($C_4H_8O$), t-butyl alcohol ($C_4H_{10}O$), carbon tetrachloride ($CCl_4$), chlorobenzene ($C_6H_5Cl$), chloroform ($CHCl_3$), cyclohexane ($C_6H_{12}$), 1,2-dichloroethane ($C_2H_4Cl_2$), dichlorobenzene, diethyl ether ($C_4H_{10}O$), diethylene glycol ($C_4H_{10}O_3$), diglyme (diethylene glycol, dimethyl ether) ($C_6H_{14}O_3$), 1,2-dimethoxy-ethane (glyme, DME, $C_4H_{10}O_2$), dimethylether ($C_2H_6O$), dimethyl-formamide (DMF, $C_3H_7NO$), dimethyl sulfoxide (DMSO, $C_2H_6OS$), dioxane ($C_4H_8O_2$), ethyl acetate ($C_4H_8O_2$), ethylene glycol ($C_2H_6O_2$), glycerin ($C_3H_8O_3$), heptanes ($C_7H_{16}$), hexamethylphosphoramide (HMPA, $C_6H_{18}N_3OP$), hexamethylphosphoroustriamide (HMPT, $C_6H_{18}N_3P$), hexane ($C_6H_{14}$), methyl t-butyl ether (MTBE, $C_5H_{12}O$), methylene chloride ($CH_2Cl_2$), N-methyl-2-pyrrolidinone (NMP, $CH_5H_9NO$), nitromethane ($CH_3NO_2$), pentane ($C_5H_{12}$), petroleum ether (ligroine), 1-propanol ($C_3H_8O$), 2-propanol ($C_3H_8O$), pyridine ($C_5H_5N$), tetrahydrofuran (THF, $C_4H_8O$), toluene ($C_7H_8$), triethyl amine ($C_6H_{15}N$), o-xylene ($C_8H_{10}$), m-xylene ($C_8H_{10}$), and p-xylene ($C_8H_{10}$).

A concentration of the polymer material in the polymer solution may have a range of about 0.1 wt % (weight percent) to about 50 wt %.

Figure 3:
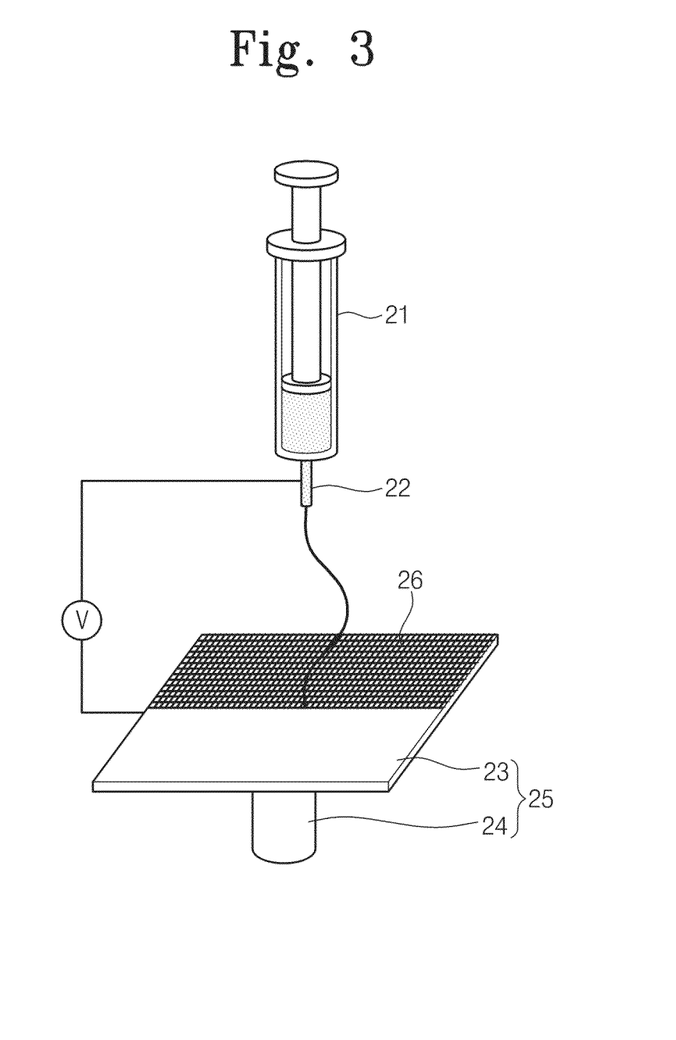
FIG. 3 is a schematic diagram illustrating an electro spinning apparatus according to embodiments of the inventive concept.

FIG. 3 schematically illustrates an electro spinning apparatus used for forming the supporting fiber in the step S10 of FIG. 1.

Referring to FIG. 3, a collector 25 may include a support part 24 and a form part 23. The form part 23 may have a plate-shape or a circular shape. The collector 25 may include a conductive material or a non-conductive material. The conductive material may include at least one of gold, silver, aluminum, copper, stainless, palladium, platinum, silicon, poly-silicon, a conductive polymer, carbon nanotube, graphene, and indium tin oxide (ITO). The non-conductive material may include at least one of glass, quartz, acryl, a OHP film, polyethylene terephthalate (PET), polyethylene naphthalate (PEN), PES, PEEK, polyimide (PI), polynorbonene, polyarylate, polycarbonate (PC), PAR, PDMS, and nonwoven fabric.

The method of forming the polymer fiber (i.e., the supporting fiber) will be described with reference to FIG. 3. The polymer solution may be provided into a cylinder 21 and then the polymer solution may be electro-spun on a surface of the form part 23 of the collector 25 through a nozzle 22 of the cylinder 21. At this time, a specific voltage may be applied between the cylinder 21 and the collector 25. Thus, the polymer fiber 26 may be formed on the surface of the form part 23 of the collector 25. The polymer fiber 26 may have a diameter within a range of about 1 nm to about 100 μm. The nozzle 22 may be single-mode. If the nozzle 22 is the single mode, the nozzle 22 may have one hole. Alternatively, the nozzle 22 may be multi-mode. If the nozzle 22 is the multi-mode, the nozzle 22 may have two or more holes. For example, if the nozzle 22 is dual-mode, the nozzle 22 may have two holes having a first hole and a second hole surrounding the first hole.

The polymer fiber may have insolubility by using an ammonia solution or a sodium hydroxide (NaOH) solution. The polymer fiber may be coated with an amine group-containing solution, so that the polymer fiber may have a high reactivity with respect to a graphene oxide. The amine group-containing solution may include at least one of bovine serum albumin (BSA), amyloid beta, poly-D-lysine, poly-L-lysine, and chitosan. The polymer fiber may be separated from the collector 25 by a vacuum dry process.

Referring to FIG. 1 again, a graphene oxide-containing solution may be formed (S20). Graphene oxide particles may be dispersed in a solvent, thereby forming the graphene oxide-containing solution.

The solvent of the graphene oxide-containing solution may include at least one of water, acetic acid ($C_2H_4O_2$), acetone ($C_3H_6O$), acetonitrile ($C_2H_3N$), benzene ($C_6H_6$), 1-butanol ($C_4H_{10}O$), 2-butanol ($C_4H_{10}O$), 2-butanone ($C_4H_8O$), t-butyl alcohol ($C_4H_{10}O$), carbon tetrachloride ($CCl_4$), chlorobenzene ($C_6H_5Cl$), chloroform ($CHCl_3$), cyclohexane ($C_6H_{12}$), 1,2-dichloroethane ($C_2H_4Cl_2$), dichlorobenzene, dichloromethane ($CH_2Cl_2$), diethyl ether ($C_4H_{10}O$), diethylene glycol ($C_4H_{10}O_3$), diglyme (diethylene glycol, dimethyl ether) ($C_6H_{14}O_3$), 1,2-dimethoxy-ethane (glyme, DME, $C_4H_{10}O_2$), dimethylether ($C_2H_6O$), dimethyl-formamide (DMF, $C_3H_7NO$), dimethyl sulfoxide (DMSO, $C_2H_6OS$), dioxane ($C_4H_8O2$), ethanol ($C_2H_6O$), ethyl acetate ($C_4H_8O_2$), ethylene glycol ($C_2H_6O_2$), glycerin ($C_3H_8O_3$), heptanes ($C_7H_{16}$), hexamethylphosphoramide (HMPA, $C_6H_{18}N_3OP$), hexamethylphosphoroustriamide (HMPT, $C_6H_{18}N_3P$), hexane ($C_6H_{14}$), methanol ($CH_4O$), methyl t-butyl ether (MTBE, $C_5H_{12}O$), methylene chloride ($CH_2Cl_2$), N-methyl-2-pyrrolidinone (NMP, $CH_5H_9NO$), nitromethane ($CH_3NO_2$), pentane ($C_5H_{12}$), petroleum ether (ligroine), 1-propanol ($C_3H_8O$), 2-propanol ($C_3H_8O$), pyridine ($C_5H_5N$), tetrahydrofuran (THF, $C_4H_8O$), toluene ($C_7H_8$), triethyl amine ($C_6H_{15}N$), o-xylene ($C_8H_{10}$), m-xylene ($C_8H_{10}$), and p-xylene ($C_8H_{10}$).

Referring to FIG. 1, a graphene oxide composite fiber may be formed (S30). The graphene oxide composite fiber may be formed using the supporting fiber formed in the step S10 and the graphene oxide-containing solution formed in the step S20.

Figure 4:
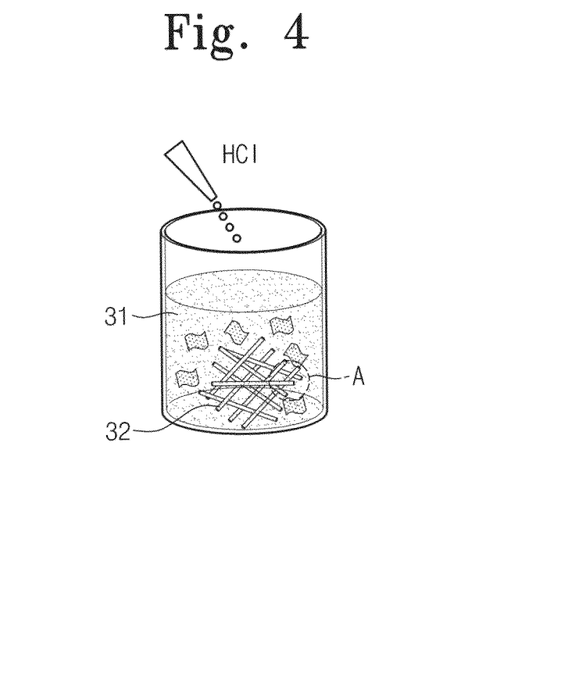
FIG. 4, a schematic diagram illustrating a process of a method of manufacturing a graphene fiber according to embodiments of the inventive concept.
Figure 5:
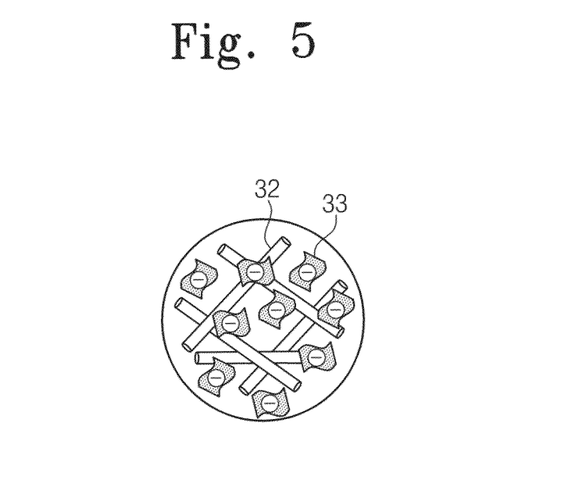
FIG. 5 is an enlarged view of a portion 'A' of FIG. 4.
Figure 6:
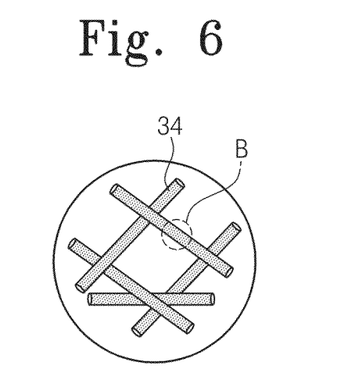
FIG. 6 is a schematic diagram illustrating a graphene oxide composite fiber according to embodiments of the inventive concept.
Figure 7:
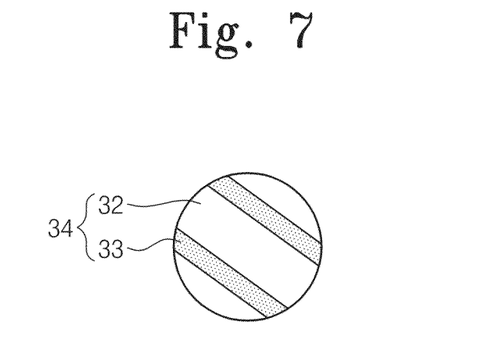
FIG. 7 is an enlarged view of a cross section taken along a long axis of a portion "B" of FIG. 6.

FIG. 4 is a schematic diagram illustrating a process of a method of manufacturing a graphene fiber according to embodiments of the inventive concept, and FIG. 5 is an enlarged view of a portion 'A' of FIG. 4. FIG. 6 is a schematic diagram illustrating a graphene oxide composite fiber according to embodiments of the inventive concept, and FIG. 7 is an enlarged view of a cross section taken along a long axis of a portion 'B' of FIG. 6.

The method of forming the graphene oxide composite fiber will be described in detail with reference to FIGS. 4 to 7. The supporting fiber 32 formed in the step S10 may be provided into the graphene oxide-containing solution 31 formed in the step S20. As described above, the supporting fiber 32 may be the polymer fiber. And then a hydrogen chloride solution may be added to the graphene oxide-containing solution 31 to control a hydrogen ion concentration (pH) of the graphene oxide-containing solution 31 at or below about 5. Thus, the supporting fiber 32 having positive charges on a surface thereof and a graphene oxide 33 having negative charges may be self-assembled to form the graphene oxide composite fiber 34 of FIGS. 5 and 6. In a cross section of the graphene oxide composite fiber 34 as illustrated in FIG. 7, the graphene oxide composite fiber 34 may include the supporting fiber 32 and the graphene oxide 33 surrounding the supporting fiber 32.

Referring to FIG. 1, the supporting fiber 32 may be separated from the graphene oxide composite fiber 34 formed in the step S30 (S40). As described above, the supporting fiber 32 may be the polymer fiber. The graphene oxide composite fiber 34 may be thermally treated or chemically melted so that the supporting fiber 32 may be separated from the graphene oxide composite fiber 34. For example, the graphene oxide composite fiber 34 may be thermally treated at a temperature within a range of about 25 degrees Celsius to about 3000 degrees Celsius (particularly, a range of about 100 degrees Celsius to about 3000 degrees Celsius) for a thermal treating time within a range of about 1 minute to about 24 hours. The chemical melting of the supporting fiber 32 in the graphene oxide composite fiber 34 may be performed using an acid-based solvent. The acid-based solvent may include at least one of acetic acid ($C_2H_4O_2$), formic acid (HCOOH), citric acid ($C_6H_8O_7$), hydrochloric acid (HCl), sulfuric acid ($H_2SO_4$), nitric acid ($HNO_3$), perchloric acid ($HClO_4$), fluoric acid (HF), phosphoric acid ($H_3PO_4$), chromic acid ($HCrO_4$), $CH_3CH_2COOH$, oxalic acid, glycol acid, tartaric acid ($C_4H_5O_6$), acetone, and toluene.

The graphene fiber may be manufactured by the method described above. The graphene fiber may have a structure including an outer surface and an inner surface surrounded by the outer surface. And the graphene fiber may include graphene oxide particles between the outer surface and the inner surface. An inner diameter of the graphene fiber may have a range of about 1 nm to 100 μm. A length of the graphene fiber may be several nanometers or more.

Figure 2:
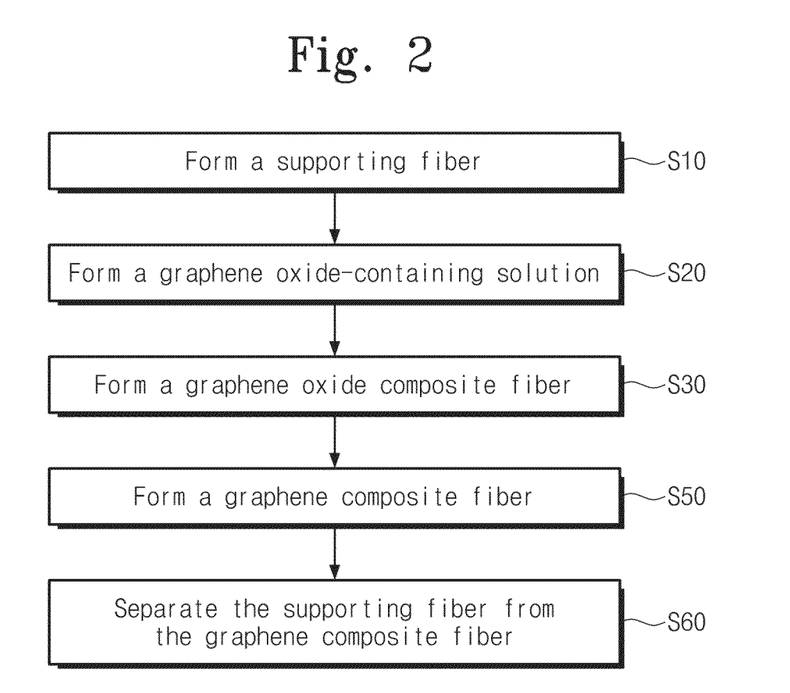
FIG. 2 is a flow chart illustrating a method of manufacturing a graphene fiber according to other embodiments of the inventive concept.

FIG. 2 is a flow chart illustrating a method of manufacturing a graphene fiber according to other embodiments of the inventive concept.

Referring to FIG. 2, a supporting fiber may be formed (S10) and then a graphene oxide-containing solution may be formed (S20). Subsequently, a graphene oxide composite fiber may be formed using the supporting fiber and the graphene oxide-containing solution (S30). The method of forming the supporting fiber, the graphene oxide-containing solution and the graphene oxide composite fiber may be substantially the same as the method described with reference to FIG. 1.

Thereafter, the graphene oxide composite fiber formed in the step S30 may be reduced to form a graphene composite fiber (S50). The reduction method may include at least one of a thermal reduction method, an optical reduction method, and a chemical reduction method. The thermal reduction method may be performed at a temperature within a range of about 40 degrees Celsius to about 3000 degrees Celsius. The optical reduction method may be performed using light having a wavelength within a range of about 200 nm to about 1500 nm. The chemical reduction method may be performed using a chemical reagent including at least one of hydriodic acid with acetic acid (HI—AcOH), hydrazine ($N_2H_4$), dimethyl hydrazine ($C_2H_8N_2$), sodium borohydride ($NaBH_4$), sodium hydroxide (NaOH), ascorbic acid, glucose, hydrogen sulfide ($H_2S$), hydroquinone ($C_6H_4(OH)_2$), and sulfuric acid ($H_2SO_4$).

The supporting fiber may be separated from the graphene composite fiber formed in the step S50 (S60). The supporting fiber may be the polymer fiber. The graphene composite fiber may be thermally treated or chemically melted so that the supporting fiber may be separated from the graphene composite fiber. The thermal treating and the chemical melting of the graphene composite fiber may be performed by the same method as described in the step S40 of FIG. 1.

The graphene fiber may be manufactured by the method described above. The graphene fiber may include an outer surface, an inner surface surrounded by the outer surface, and graphene particles between the outer surface and the inner surface. An inner diameter of the graphene fiber may have a range of about 1 nm to 100 μm. A length of the graphene fiber may be several nanometers or more.

EXPERIMENTAL EXAMPLE 1

A chitosan fiber was formed by the step S10. A chitosan powder (Sigma Aldrich Co. LLC.) was supplied into a trifluoroacetic acid solution and then the trifluoroacetic acid solution including the chitosan powder was mixed by a stirrer at 50 degrees Celsius for 6 hours, thereby forming a chitosan solution.

Figure 8:
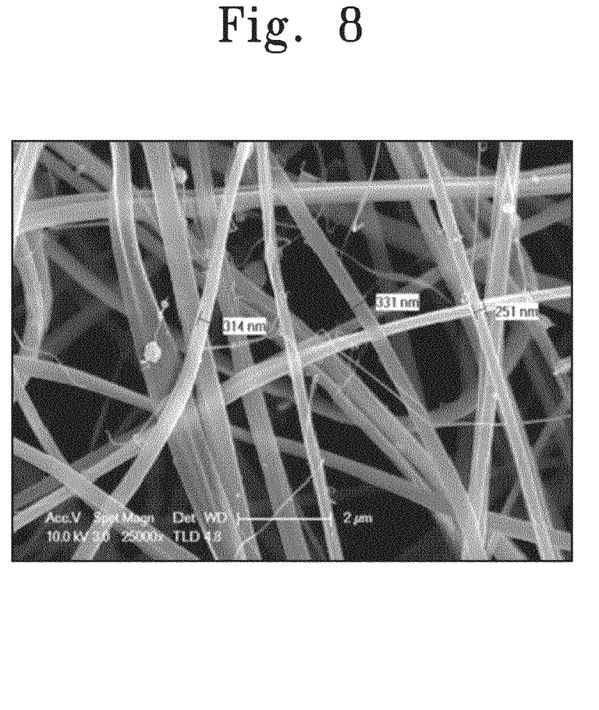
FIG. 8 is a scanning electron microscope (SEM) photograph of a chitosan fiber formed by a first experimental example.

After the formed chitosan solution was supplied into the cylinder 21 of FIG. 3, the chitosan solution was electro-spun to the collector 25 under the condition that the applied voltage was 15 kV, a distance between the cylinder 21 and the collector 25 was 10 cm, and a solution injection speed was within a range of about 1 ml/h to about 5 ml/h. A chitosan fiber having a diameter within a range of several nanometers to several micrometers may be formed according to a spinning condition of a concentration of the chitosan solution and the applied voltage. The chitosan fiber was neutralized in an ammonia solution for about 4 hours and then was cleaned three times by distilled water so that the chitosan fiber had insolubility. After the chitosan fiber was dried in a vacuum oven for about 24 hours, the chitosan fiber was separated from the collector 25. A scanning electron microscope (SEM) photograph of the chitosan fiber formed at this time is illustrated in FIG. 8. Referring to FIG. 8, a diameter of the chitosan fiber was within a range of about 251 nm to about 331 nm.

The graphene oxide-containing solution was formed by the step S20. Modified Hummers and offenmans methods were performed on SP-1 graphite powder (Bay carbon Co.) so that graphene oxide powder was formed. After the graphene oxide powder was added to distilled water in a weight ratio of about 0.05 wt % to about 0.5 wt %, the graphene oxide powder was dispersed in the distilled water by an ultrasonic method for about 4 hours. Thus, a graphene oxide-containing solution was formed. Sizes of particles of the graphene oxide were within a range of about 0.5 nm to about 2.9 nm.

Figure 9:
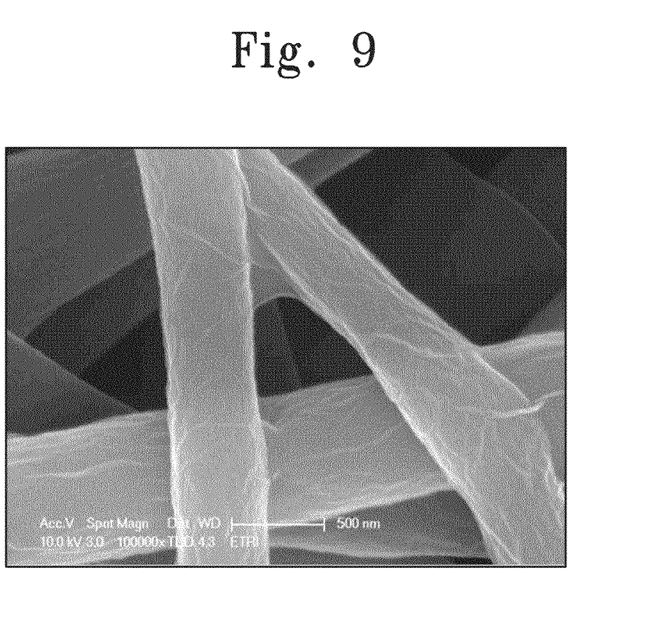
FIG. 9 is a SEM photograph of a graphene oxide composite fiber formed by a first experimental example.

The graphene oxide composite fiber was formed according to the step S 30. After the hydrogen ion concentration (pH) of the formed graphene oxide solution was adjusted at about 4.3, the formed chitosan fiber was soaked in the graphene oxide solution having the hydrogen ion concentration (pH) of about 4.3 for about 5 hours. Amide groups formed on the surface of the chitosan fiber and hydroxyl groups and carboxyl groups of the graphene oxide were self-assembled to form the composite fiber of a graphene oxide chitosan coaxial type. After the formed graphene oxide composite fiber was taken out, the graphene oxide composite fiber was cleaned three times by distilled water and then was dried in a vacuum oven for about 24 hours. A SEM photograph of the graphene oxide composite fiber formed at this time is illustrated in FIG. 9. Referring to FIG. 9, a diameter of the graphene oxide composite fiber was a range of about 500 nm to about 800 nm.

The graphene oxide composite fiber was reduced to form the graphene composite fiber according to the step S50. The graphene oxide composite fiber was reduced to the graphene composite fiber by a room temperature vapor method using a hydriodic acid with acetic acid (HI—AcOH) solution. In more detail, the graphene oxide composite fiber was supplied into an airtight glass container in which a mixture solution of hydriodic acid of about 2 ml and acetic acid of 5 ml was supplied. And then the graphene oxide composite fiber and the mixture solution were reacted with each other at about 40 degrees Celsius for about 24 hours. Thus, the reduced graphene composite fiber was formed.

The chitosan fiber being the supporting fiber was separated from the reduced graphene fiber according to the step S60. In more detail, the graphene composite fiber may be thermally treated at a temperature within a range of about 100 degrees Celsius to about 200 degrees Celsius for about 24 hours or be soaked in the acid-based solvent for about 30 minutes so that the chitosan fiber supporting the graphene is removed. Thus, the graphene fiber was completed.

EXPERIMENTAL EXAMPLE 2

A nylon fiber was formed according to the step S10. Nylon-6 powder (Sigma-Aldrich Co. LLC.) was supplied into a formic acid solution and then the formic acid solution including the nylon-6 powder was mixed by a stirrer at 50 degrees Celsius for about 6 hours, thereby forming a nylon solution.

After the formed nylon solution was supplied into the cylinder 21 of FIG. 3, the nylon solution was electro-spun to the collector 25 under the condition that the applied voltage was 15 kV, a distance between the cylinder 21 and the collector 25 was 10 cm, and a solution injection speed was within a range of about 0.5 ml/h to about 5 ml/h. A nylon fiber having a diameter within a range of several nanometers to several micrometers may be formed according to a spinning condition of a concentration of the nylon solution and the applied voltage. The formed nylon fiber was reacted in a bovine serum albumin (BSA) solution of about 10% concentration for about 30 minutes and then was dried in a hood.

The graphene oxide-containing solution was formed by the same method as described in the Experimental example according to the step S20.

The graphene oxide composite fiber was formed according to the step S30. After the hydrogen ion concentration (pH) of the formed graphene oxide solution was adjusted at about 4.3, the formed nylon fiber was soaked in the graphene oxide solution having the hydrogen ion concentration (pH) of about 4.3 for about 5 hours. Amide groups formed on the surface of the nylon fiber and hydroxyl groups and carboxyl groups of the graphene oxide were self-assembled to form the composite fiber of a graphene oxide nylon coaxial type. After the formed graphene oxide composite fiber was taken out, the graphene oxide composite fiber was cleaned three times by distilled water and then was dried in a vacuum oven for about 24 hours.

The graphene oxide composite fiber was reduced by the same method as described in the experimental example 1 according to the step S50, thereby forming the graphene composite fiber.

The nylon fiber being the supporting fiber was separated from the reduced graphene composite fiber by the same method as described in the experimental example 1 according to the step S60. Thus, the graphene fiber was completed.

According to embodiments of the inventive concept, it is possible to easily manufacture the large-area graphene fiber having high strength, high flexibility, and high porosity.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A method of manufacturing a graphene oxide composite fiber, comprising:
    forming a supporting fiber;
    coating the supporting fiber with a material that is effective to provide a positive surface charge on the supporting fiber;
    forming a solution containing graphene oxide having a negative charge thereon to provide a graphene oxide-containing solution;
    coating the supporting fiber with the graphene oxide-containing solution; and
    permitting self-assembly of the graphene oxide of the graphene oxide-containing solution and the supporting fiber by an attraction between the positive and negative charges to form the graphene oxide composite fiber.

2. The method of claim 1, wherein the supporting fiber is a polymer fiber.

3. The method of claim 2, wherein forming the supporting fiber comprises electro-spinning a polymer solution onto a collector.

4. The method of claim 3, wherein the polymer solution includes at least one polymer selected from the group consisting of polyamide-6, polyurehthanes, polybenzimidazole, polyacrylonitrile, polyaniline (PANI), polyvinylcarbazole, polyacrylamide (PAAm), polyimide, poly-metaphenylene isophtalamides, polylactic-co-glycolic acid, poly caprolactone, polyglycolide, poly lactic acid, poly-3-hydroxylbutyrate, betaamyloid, collagen, fibrin, chitosan, and gelatin.

5. The method of claim of claim 3, wherein the polymer solution includes at least one solvent selected from the group consisting of water, ethanol, methanol, acetone, phosphate buffered saline (PBS) buffer, acetic acid ($C_2H_4O_2$), formic acid ($CH_2O_2$), hexafluoro-2-propanol (($CF_3$)$_2$CHOH), trifluoroaceticacid ($C_2HF_3O_2$), dichloromethane ($CH_2Cl_2$), acetonitrile ($C_2H_3N$), benzene ($C_6H_6$), 1-butanol ($C_4H_{10}O$), 2-butanol ($C_4H_{10}O$), 2-butanone ($C_4H_8O$), t-butyl alcohol ($C_4H_{10}O$), carbon tetrachloride ($CCl_4$), chlorobenzene ($C_6H_5Cl$), chloroform ($CHCl_3$), cyclohexane ($C_6H_{12}$), 1,2-dichlereethane ($C_2H_4Cl_2$), dichlorobenzene, diethyl ether ($C_4H_{10}O$), diethylene glycol ($C_4H_{10}O_3$), diglyme (diethylene glycol, dimethyl ether) ($C_6H_{14}O_3$), 1,2-dimethexy-ethane (glyme, DME, $C_4H_{10}O_2$), dimethylether ($C_2H_6O$), dimethylformamide (DMF, $C_3H_7NO$), dimethyl sulfoxide (DMSO, $C_2H_6OS$), dioxane ($C_4H_8O_2$), ethyl acetate ($C_4H_8O_2$), ethylene glycol ($C_2H_6O_2$), glycerin ($C_3H_8O_3$), heptanes ($C_7H_{16}$), hexamethylphosphoramide (HMPA, $C_6H_{18}N_3OP$), hexamethylphosphoroustriamide (HMPT, $C_6H_{18}N_3P$), hexane ($C_6H_{14}$), methyl t-butyl ether (MTBE, $C_5H_{12}O$), methylene chloride ($CH_2Cl_2$), N-methyl-2-pyrrolidinone (NMP, $CH_5H_9NO$), nitromethane ($CH_3NO_2$), pentane ($C_5H_{12}$), petroleum ether (ligroine), 1-propanol ($C_3H_8O$), 2-propanol ($C_3H_8O$), pyridine ($C_5H_5N$), tetrahydrofuran (THF, $C_4H_8O$), toluene ($C_7H_8$), triethyl amine ($C_6H_{15}N$), o-xylene ($C_8H_{10}$), m-xylene ($C_8H_{10}$), and p-xylene ($C_8H_{10}$).

6. The method of claim 2, wherein forming the supporting fiber further comprises providing insolubility to the supporting fiber by treating the supporting fiber with an ammonia solution or a sodium hydroxide solution.

7. The method of claim 2, wherein the material for coating the supporting fiber is a material containing an amine group.

8. The method of claim 1, wherein the the material for coating the supporting fiber is at least one amine-group containing material selected from the group consisting of bovine serum albumin (BSA), amyloid beta, poly-D-lysine, poly-L-lysine, and chitosan.

9. The method of claim 1, further comprising reducing the graphene oxide composite fiber to a graphene composite fiber.

10. The method of claim 9, wherein reducing the graphene oxide composite fiber to a graphene composite fiber is accomplished by one of a thermal reduction method, an optical reduction method, and a chemical reduction method.

11. The method of claim 10, wherein reducing the graphene oxide composite fiber to a graphene composite fiber is accomplished by the thermal reduction method, and the thermal reduction method is performed at a temperature ranging from about 40 degrees Celsius to about 3000 degrees Celsius.

12. The method of claim 10, wherein reducing the graphene oxide composite fiber to a graphene composite fiber is accomplished by the optical reduction method, and the optical reduction method employs light having a wavelength ranging from about 200 nm to about 1500 nm.

13. The method of claim 10, wherein reducing the graphene oxide composite fiber to a graphene composite fiber is accomplished by the chemical reduction method, and the chemical reduction method employs at least one chemical reagent selected from the group consisting of hydriodic acid with acetic acid (Hl-AcOH), hydrazine ($N_2H_4$), dimethyl hydrazine ($C_2H_8N_2$), sodium borohydride ($NaBH_4$), sodium hydroxide (NaOH), ascorbic acid, glucose, hydrogen sulfide ($H_2S$), hydroquinone ($C_6H_4(OH)_2$), and sulfuric acid ($H_2SO_4$).

* * * * *